US006208874B1

(12) United States Patent
Rudisill et al.

(10) Patent No.: US 6,208,874 B1
(45) Date of Patent: Mar. 27, 2001

(54) TELEPHONE ASSEMBLY WITH AUTOMATIC ANTENNA ADJUSTMENT

(75) Inventors: Charles Albert Rudisill, Apex; Sean Ryan, Wake Forest, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/184,381

(22) Filed: Nov. 2, 1998

(51) Int. Cl.[7] .................................................. H04B 1/38
(52) U.S. Cl. ........................ 455/550; 455/90; 455/575
(58) Field of Search ............................. 455/90, 95, 556, 455/562, 575, 550; D14/138, 217, 230, 231, 236, 237, 238; 379/428, 433, 434; 343/702, 878, 881, 882, 752

(56) References Cited

U.S. PATENT DOCUMENTS

| 5,369,788 | | 11/1994 | Nagai . | |
|---|---|---|---|---|
| 5,404,390 | | 4/1995 | Tamura . | |
| 5,513,383 | * | 4/1996 | Tsao | 455/90 |
| 5,590,416 | * | 12/1996 | Rydbeck | 455/90 |
| 5,630,211 | | 5/1997 | Nagai . | |
| 5,649,309 | | 7/1997 | Wilcox et al. . | |
| 5,657,370 | | 8/1997 | Tsugane et al. . | |
| 5,706,332 | | 1/1998 | Nagai . | |
| 5,809,403 | * | 9/1998 | MacDonald, Jr. et al. | 455/90 |
| 5,850,612 | * | 12/1998 | Kulberg et al. | 455/550 |
| 5,901,367 | * | 5/1999 | Toh | 455/575 |
| 5,909,653 | * | 6/1999 | Imura et al. | 455/575 |
| 5,926,748 | * | 7/1999 | Yohsihara et al. | 455/90 |
| 5,956,625 | * | 9/1999 | Hansen et al. | 455/90 |
| 6,002,945 | * | 12/1999 | McDuffee | 455/556 |
| 6,009,338 | * | 12/1999 | Iwata et al. | 455/575 |
| 6,052,567 | * | 4/2000 | Ito et al. | 455/90 |

FOREIGN PATENT DOCUMENTS

| 0 661 825 A1 | 12/1994 | (EP) . |
|---|---|---|
| 07038461 | 7/1993 | (JP) . |
| 7-38461 | 2/1995 | (JP) . |

* cited by examiner

*Primary Examiner*—Nay Maung
(74) *Attorney, Agent, or Firm*—Wood, Phillips, VanSanten, Clark & Mortimer

(57) ABSTRACT

A telephone is provided with a first housing and a second housing slideably secured to the first housing for movement between an open position and a closed position, said second housing projecting out from said first housing in said open position. The telephone also includes an antenna pivotably attached to said second housing. A position control mechanism is provided to pivot said antenna away from said second housing, and a guide is provided to secure said antenna against pivoting when said second housing is in said closed position.

28 Claims, 12 Drawing Sheets

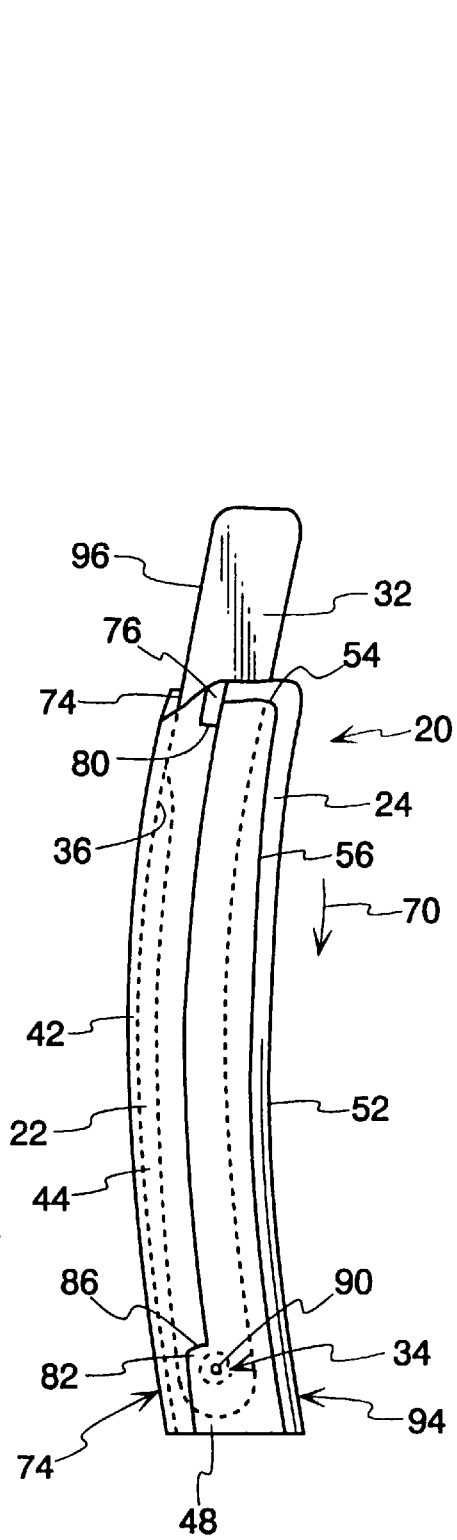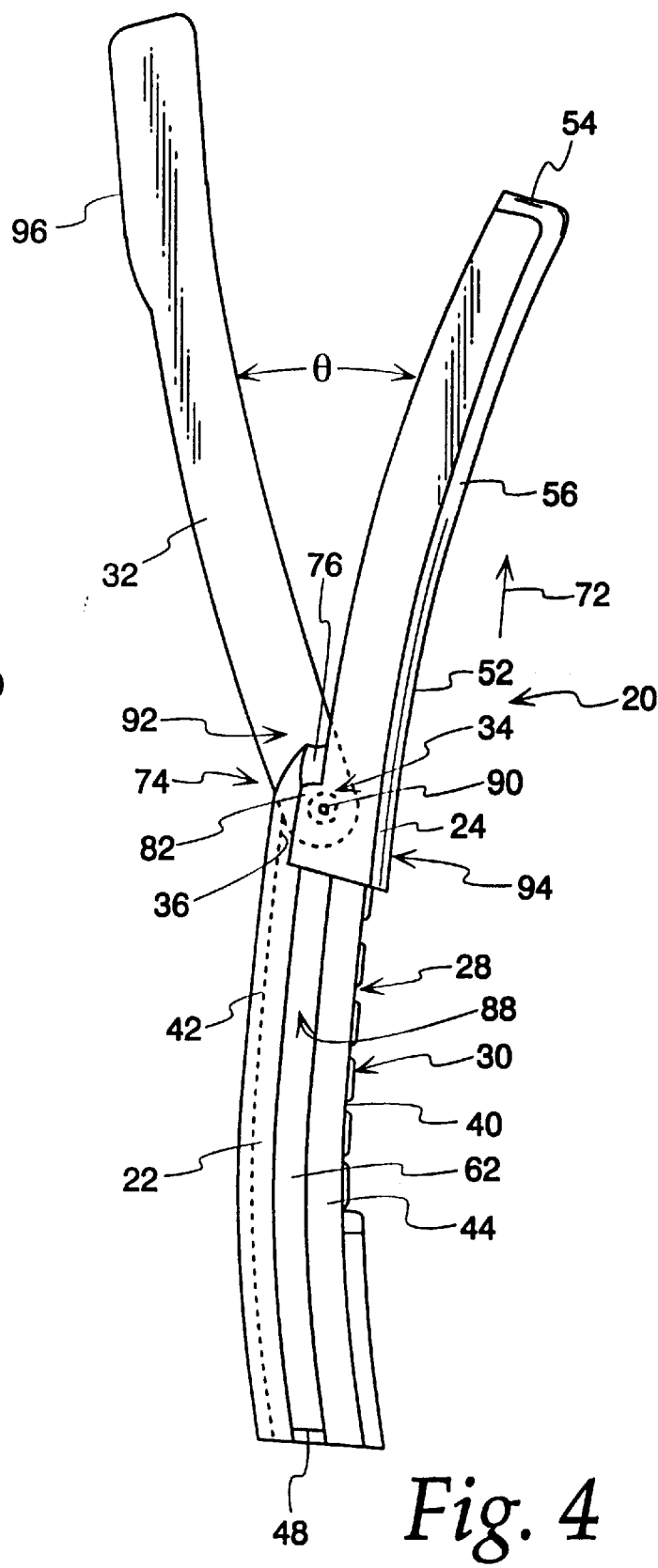

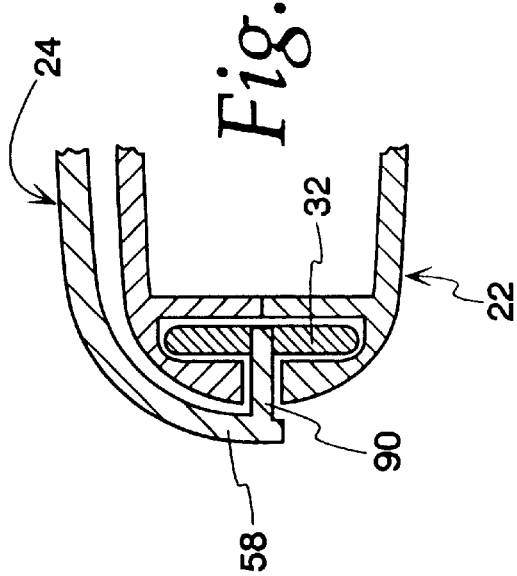
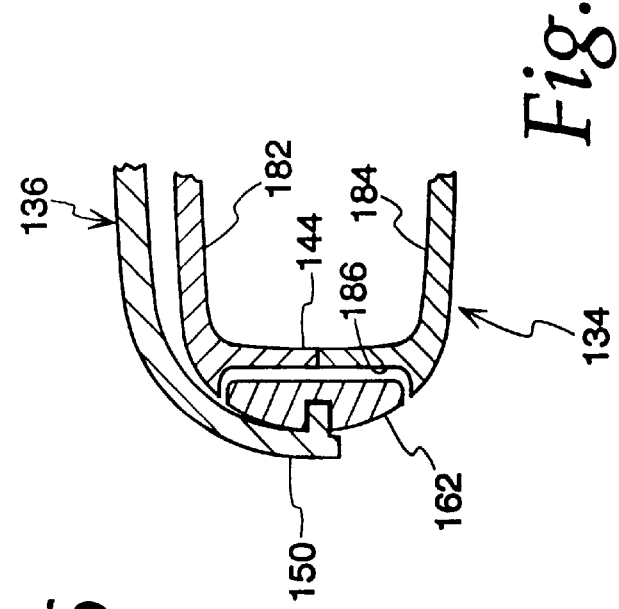
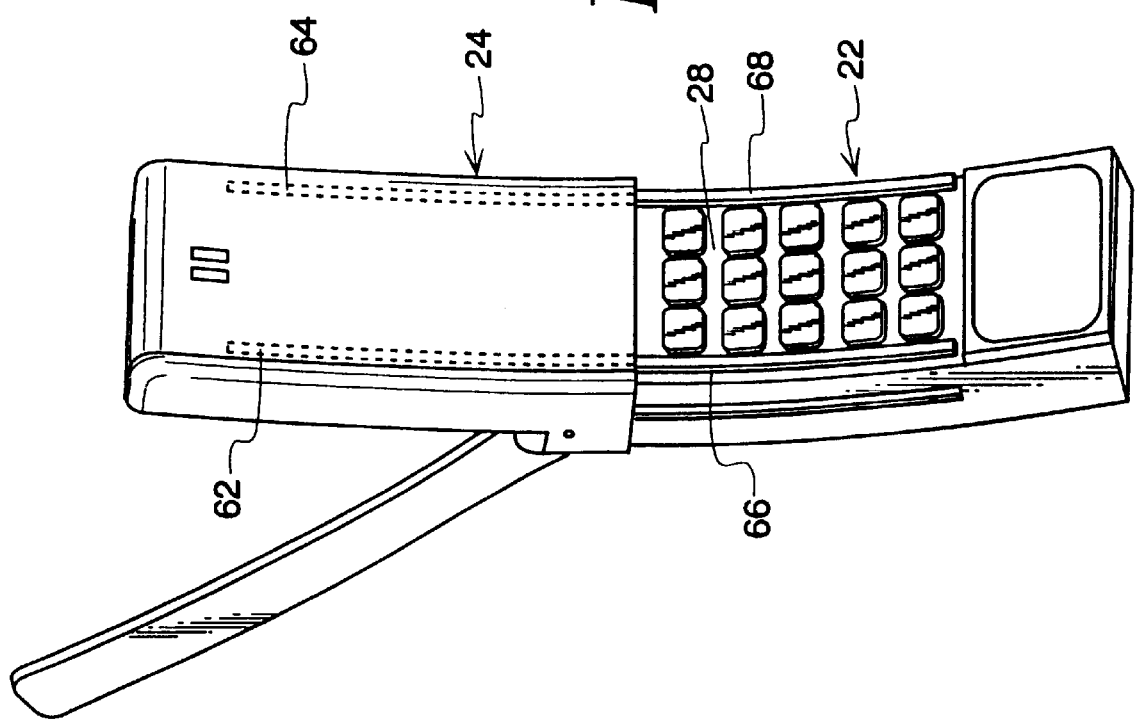

TELEPHONE ASSEMBLY WITH AUTOMATIC ANTENNA ADJUSTMENT

FIELD OF THE INVENTION

The present invention is directed to a telephone assembly, and in particular, to a telephone assembly with an antenna or antennas which can be adjusted automatically, i.e., without direct user action.

BACKGROUND OF THE INVENTION

At the present time, a definite trend has formed towards smaller cellular telephones, in terms of volume and footprint. Some telephones presently being sold commercially are small enough and light enough to slip into a shirt pocket. Given the high degree of portability of such phones, consumer preference for the smaller, lighter telephones has grown considerably.

However, decreasing the size of these telephones requires the designer to balance many competing interests. For example, there is a minimum distance which must be maintained between the microphone and the speaker in the telephone design to accommodate the distance between a user's mouth and his or her ear. Telephones which do not maintain a mouth-to-ear distance of 140 mm (5.5 inches) have been considered by some users as too small for comfortable use.

There are several ways in which the cellular telephone manufacturers have attempted to balance the desire for small size with the need to maintain proper mouth-to-ear distance. One common way is to use a two-piece "flip" design, i.e., the first piece with the microphone mounted thereto (lower piece) is joined to the second piece with the speaker mounted thereto (upper piece) for pivoting movement about an axis of rotation. See U.S. Pat. No. 5,649,309. Another common solution is to use a two-piece housing with a sliding connection between the first piece with the microphone mounted thereto (lower piece) and second piece with the speaker mounted thereto (upper piece). See U.S. Pat. Nos. 5,657,370 and 5,369,788. Through the use of such designs, the competing interests of size and mouth-to-ear distance are balanced.

However, an ergonomically correct design is meaningless if functionality is affected. Therefore, the cellular telephone designer must not only design for comfort and looks, but for performance as well.

In a cellular telephone system, radio frequency signals are used to convey information, such as an audio message, from one point to another. Specifically, the cellular system is made up of a number of centralized transmitter/receiver stations, referred to as base stations, and much greater number of cellular telephone units, which are moveable relative to the base stations, referred to as mobile stations. Both the base stations and the mobile stations have antennas which can be used to transmit and receive radio frequency signals.

The performance of the cellular telephone system can be affected by obstructions between the base stations and the mobile stations that block the path of propagation of signals between the stations. For example, the path of propagation between the base station and the mobile station may be blocked by buildings, trees, mountains, or vehicles. In fact, the head of the user may also obstruct the propagation of the radio frequency signal between the mobile station and the base station.

To limit obstruction caused by the user's head, it is advantageous to have the antenna mounted as far away as possible from the user's head. Additionally, the antenna may be angled away from the user's head to further minimize the interference caused thereby to the telephone's performance. Some designs integrate both remote placement and angled placement. See U.S. Pat. No. 5,404,390.

Of course, as the size of the telephone becomes smaller, less and less room is available for placement of the antenna remotely from the user's head. Furthermore, placement of the antenna at an angle to the user's head can increase the footprint of the telephone and/or the space required to store the antenna within the telephone housing. Additionally, retraction of the antenna into the housing is complicated by the angle at which the antenna is disposed relative to the housing to which it is attached.

As one possible compromise between the competing concerns of size, mouth-to-ear distance, and telephone performance, several patents have suggested use of a flip telephone design wherein the antenna is secured to the lower portion of the telephone rather than the upper portion. U.S. Pat. No. 5,649,309 illustrates one such telephone. U.S. Pat. No. 5,706,332 illustrates a variation of the basic design wherein the antenna has been pivotably secured to the lower portion of the flip. In both designs, the antenna is disposed remotely from and at an angle to the user's head with the flip in its operative state and the antenna in its extended state.

Alternatively, U.S. Pat. No. 5,630,211 illustrates a flip telephone wherein the antenna is mounted separately from the upper and lower pieces. As shown in FIGS. 1a and 1b of the patent, when the lower portion of the flip is moved clockwise relative to the upper portion of the flip, the antenna is also moved clockwise relative to the upper portion. In particular, as shown in FIGS. 3a–3c, a pin attached to the lower portion cooperates with a slot in the antenna to move the antenna with the lower portion in a clockwise direction. To space the antenna from the lower portion of the telephone, the antenna may be moved further in a clockwise direction (see FIG. 3c). FIGS. 4a and 4b show the antenna mounted for movement with the upper portion of the telephone, rather than with the lower portion of the telephone.

While these designs allow for the spacing of the antenna from the upper (or lower) portion of the telephone to reduce the obstruction caused by the user's head, the designs typically also require several motions to configure the telephone in its operative state. For example, U.S. Pat. Nos. 5,649,309; 5,706,332 and 5,630,211 require the user to not only open and close the flip, but also to extend and retract the antenna between its operative state and its retracted or stored state. Moreover, in U.S. Pat. No. 5,630,211, because the antenna is pivotable relative to both the upper and lower pieces, the design requires an additional movement by the user in rotating the antenna away from the lower (1a, 1b) or upper (4a, 4b) portion of the telephone to provide the desired spacing between speaker and antenna.

Moreover, because of the rotary motion involved, the contacts between the antenna and the remainder of the circuitry become quite complex. Further, the contacts and the connection mechanism itself can be quite fragile, easily susceptible to damage when jarred or dropped.

To reduce the number of motions required to configure the telephone between operative and inoperative states, some flip telephones have been fitted with a spring mechanism to move the two pieces relative to each other at the push of a button. See U.S. Pat. Nos. 5,649,309 and 5,706,332. However, these spring mechanisms take up valuable space within the telephone housing, and have proven to be fragile, costly and complex to manufacture. Further, the user must be careful not to obstruct the movement of the flip, a complicated proposition with the size of the still be extended and retracted, so only a minimal conservation of motion has been achieved.

As a further alternative, Japanese Laid Open Application 7-38461 shows a phone wherein a second housing is coupled to an antenna, such that movement of the second housing relative to a first housing causes the antenna to move between a first, retracted state and a second, extended state. One of the phones shown is a flip phone, wherein the second housing is coupled to the antenna by a gear train such that movement of the second housing relative to the first housing causes the antenna to move axially between first and second states. Another of the phone has a sliding connection between the first and second housings, and the second housing has a projection which is received within a hole in the antenna to couple the antenna to the second housing such that movement of the second housing relative to the first housing causes the antenna to move axially between first and second states.

While these phones allow for the user to move the second housing and the antenna relative to the first housing using a single motion, thereby achieving an open and extended state, these phones may still have disadvantages. As stated above, it is important to maximize the distance between the antenna and the user's head. Even with the spacing between the antenna and the second housing shown, the user's head may present a significant obstacle to the propagation between the telephone and a base station.

SUMMARY OF THE INVENTION

According to an aspect of the present invention, a telephone has a first housing and a second housing slideably secured to the first housing for movement between an open position and a closed position, said second housing projecting out from said first housing in said open position. The telephone also includes an antenna pivotably attached to said second housing. A position control mechanism is provided to pivot said antenna away from said second housing, and a guide is provided to secure said antenna against pivoting when said second housing is in said closed position.

In a preferred form of this aspect of the invention, the telephone may include a wall attached to one of the first and second housings with an channel-like track defined therein, and a rail-like guide attached to the other of the first and second housings which is disposed in the channel-like track. Additionally, the channel-like track may have a pair of oppositely facing curved sides which define a curved pathway, and the rail-like guide may have a pair of curved sides each of which face one of the sides of the channel-like track. Alternatively, the channel-like track may have a pair of oppositely facing planar sides which define a linear pathway, and the rail-like guide may have a pair of planar sides each of which face one of the sides of the channel-like track.

In another preferred form of this aspect of the invention, the guide may be attached to the first housing and the first housing may have a first wall which faces the guide to define a channel-like space therebetween, and the antenna may be substantially disposed within the channel-like space with the second housing in the closed position and may substantially project from the channel-like space with the second housing in the open position. Further, the first housing may have a second wall adjacent the channel-like space, and the antenna may be disposed on one side of the second wall and the second housing may be disposed on the other side of the second wall. Additionally, a pin may be fixedly attached to the antenna and pivotably attached to the second housing, the second wall of the first housing having a slot therethrough through which the pin depends.

In a further preferred form of this aspect of the invention, the first housing may have a wall, and the second housing may have a wall which when the second housing is in the closed state substantially overlies the first housing wall and which when the second housing is in the open state is disposed remotely from the first housing wall so that the first housing wall is exposed. The first housing wall may have a first section and a second section, and the second housing wall may overlie only the first section of the first housing wall when the second housing is in the closed position. A keypad may be attached to the first section of the first housing wall, and a display may be attached to the second section of the first housing wall.

According to another aspect of the present invention, a telephone has a first housing and a second housing slideably secured to the first housing for movement between an open position and a closed position, said second housing projecting out from said first housing in said open position. The telephone also includes an antenna pivotably attached at one end to said second housing. A biasing member is provided to urge said antenna toward pivoting about said one end in a first direction to an extended position away from said second housing, and a guide is provided to block said antenna from pivoting to said extended position when said second housing is in said closed position.

In another preferred form of this aspect of the invention, the guide may be attached to the first housing and the first housing may have a first wall which faces the guide to define a channel-like space therebetween, and the antenna may be substantially disposed within the channel-like space with the second housing in the closed position and may substantially project from the channel-like space with the second housing in the open position. The antenna may be a blade-type antenna having a first end which is pivotably attached to the second housing and a second end having an enlarged head which abuts the guide with the antenna in the channel-like space.

According to a still further aspect of the present invention, a telephone has a first housing, a second housing slideably secured to the first housing for movement between an open position and a closed position, said second housing projecting out from said first housing in said open position, and an antenna. A pivot member is provided to attach said antenna to said second housing, and a guide assembly is provided to control movement of said antenna relative to said first housing when said second housing moves between said open and closed positions. The guide assembly includes a pivot control mechanism cooperating with said pivot member to pivot said antenna to an extended position away from said second housing when said second housing is moved to said open position.

In a preferred form of this aspect of the invention, the pivot control mechanism may be a first surface defined on the first housing and a second surface defined on the antenna, the first surface abutting the second surface at a position offset from the pivot member. Further, the pivot control mechanism may be a pin attached to the first housing which defines the first surface and a slot in the antenna which is defined by the second surface. Also, the pivot member may be a pin attached to the antenna having a first cross-sectional area, and the second housing may have a slot in which the antenna pin is disposed which has a cross-sectional area which is greater than the cross-sectional area of the antenna pin.

In a preferred form of this aspect of the present invention, the guide assembly has a pin and slot connection between said antenna and said first housing, said slot extending substantially in the direction of sliding movement of said second housing.

In another preferred form of this aspect of the present invention, the pivot control mechanism includes a slot end engaging said pin prior to said second housing reaching said open position.

According to a further aspect of the present invention, a telephone has a first housing and a second housing slideably secured to the first housing for movement between an open position and a closed position. The second housing projects out from the first housing in the open position. An antenna is slideably secured to the first housing and has a first end which is moveable between an extended position and a retracted position. The antenna projects out from the first housing with the first end spaced from the first housing in the extended position. A control mechanism attaches the first end of the antenna to the second housing.

In a preferred form of this aspect of the present invention, the antenna may be a rod having a first end which defines the first end of the antenna, and the control mechanism may be a pair of arms projecting from the second housing and defining a slot therebetween in which the first end of the rod is disposed to attach the first end of the antenna to the second housing.

According to a still further aspect of the present invention, a telephone has a first housing with a contact thereon. A second housing is slideably secured to the first housing for movement between an open position and a closed position, projecting out from the first housing in the open position. The telephone also includes first and second antennas on second housing. The first antenna is positioned on the second housing to couple with the contact when the second housing is in the closed position, and the second antenna position on the second housing to couple with the contact when the second housing is in the open position.

In a preferred form of this aspect of the present invention, the first housing may have a wall with a surface, and the second housing may have a wall with a surface which faces the surface of the wall of the first housing with the second housing in the closed position. In this case, the first and second antennas are attached to the surface of the second housing. Further, the first and second antennas may be metal stampings which are glued or ultrasonically attached to the surface of the wall of the second housing. Alternatively, the first and second antennas may be flexible films or photo-etched platings.

BRIEF DESCRIPTION OF THE DRAWINGS

FIG. 3 is a side view of the telephone assembly as shown in FIG. 1 with a second housing in a closed position;

FIG. 4 is a side view of the telephone assembly as shown in FIG. 1 with the second housing in an open position;

FIG. 6 is frontal, perspective view of an alternative sliding attachment mechanism;

FIG. 7 is an enlarged, fragmentary, cross-sectional view of an alterative mechanism for attachment of the antenna to the second housing;

FIG. 13 is an enlarged, fragmentary cross-sectional view of an alternative mechanism for attachment of the antenna to the second housing;

DETAILED DESCRIPTION OF THE PREFERRED EMBODIMENT

Figure 2:
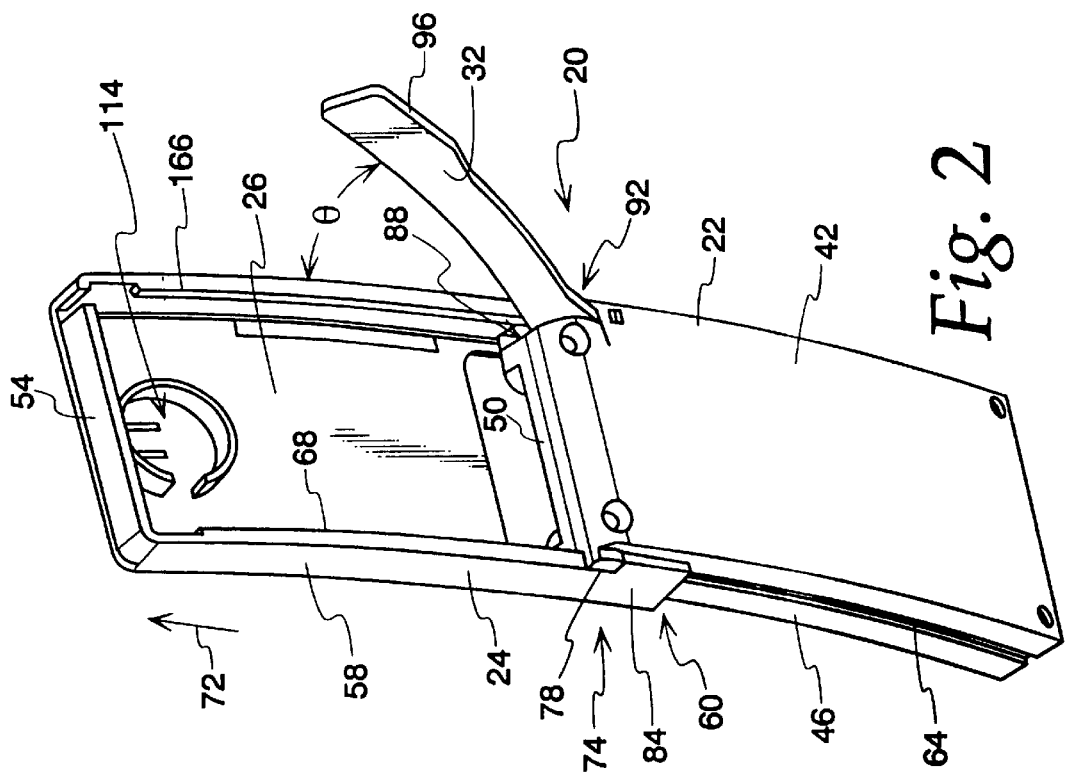
FIG. 2 is a rear, perspective view of the telephone assembly shown in FIG. 1 in an open position.
Figure 1:
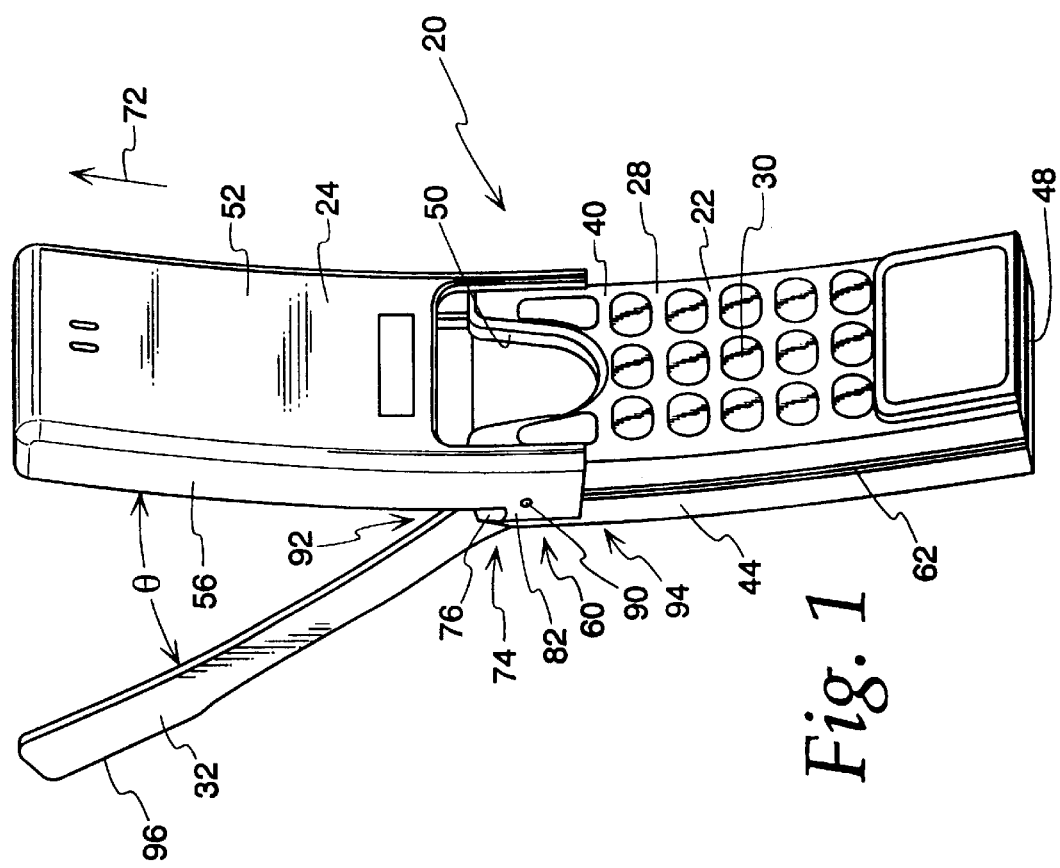
FIG. 1 is a frontal, perspective view of a telephone assembly according to the present invention in an open position.
Figure 5:
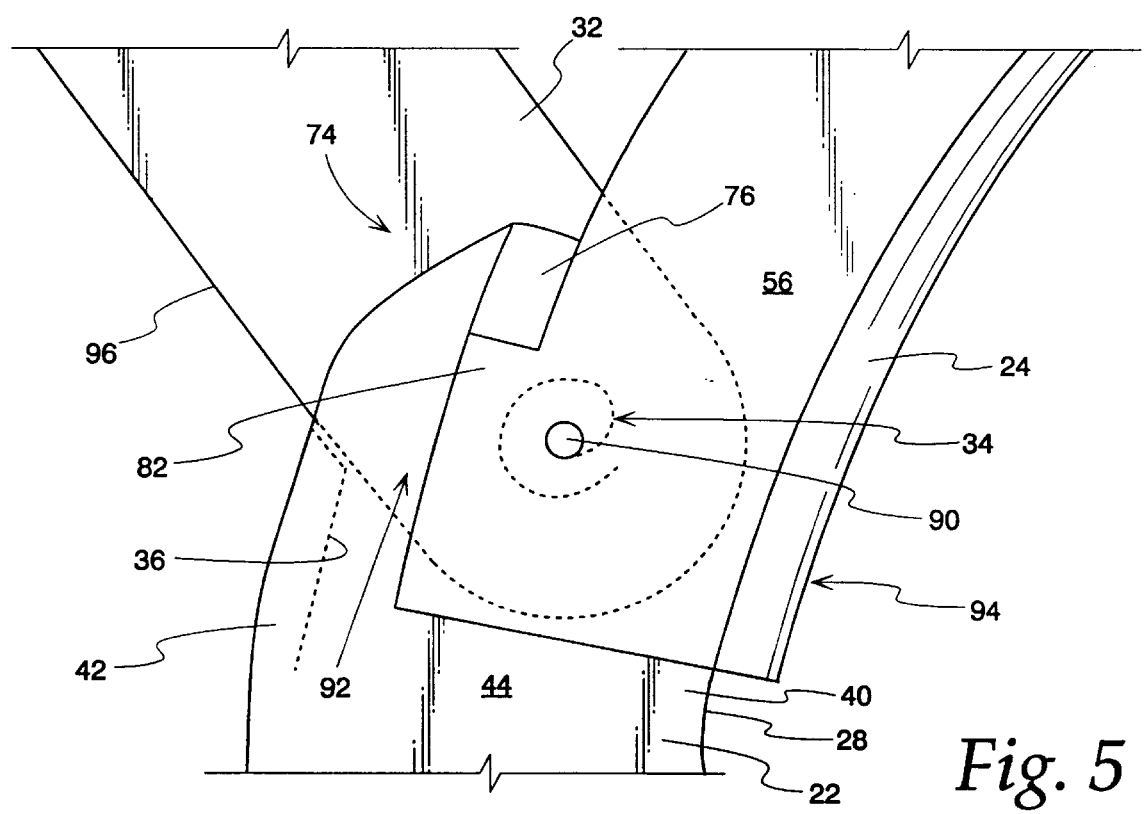
FIG. 5 is an enlarged, fragmentary view of a biasing mechanism and a locking mechanism shown in FIGS. 1–4.

As shown in FIGS. 1 and 2, a telephone assembly 20 according to the present invention has a first housing 22 and a second housing 24. The second housing 24 is slideably attached to the first housing 22 for movement between an open or operative position and a closed position (compare FIG. 4 with FIG. 3). In the open position, the second housing 24 projects our from the first housing 22 such that a first surface 26 (see FIG. 2) of the second housing 24 is disposed substantially remotely from a first surface 28 (see FIG. 1) of the first housing 22, thereby exposing a keypad 30, for example. In the closed position, the first surface 26 of the second housing 24 substantially overlies the first surface 28 of the first housing 22, covering thereby the keypad 30.

An antenna 32 is pivotably secured to the second housing 24. As a consequence, the antenna 32 is moveable with the second housing 24 relative to the first housing 22 between the open and closed positions. Further, by virtue of the pivotable connection between the antenna 32 and the second housing 24, the antenna 32 is also moveable relative to the second housing 24 between an extended (or rotated) position, shown in FIGS. 1, 2 and 4, and a retracted position, shown in FIG. 3.

A position control mechanism 34, such as a biasing member in the form of a torsion spring illustrated in FIGS.

3–5, is attached to the antenna 32 and the second housing 24 to apply a torsional force about the pivotable connection between the second housing 24 and the antenna 32 to pivot the antenna 32 away from the second housing 24 toward the extended position. Pivotal movement of the antenna 32 in the direction of the extended position is resisted by a guide surface 36 of the first housing 22 (see FIG. 3). With the second housing 24 in the closed position relative to the first housing 22, the guide surface 36 cooperates with a first end of the antenna 32 to secure the antenna 32 against pivoting. With the second housing 24 in the open position, the antenna 32 is shaped such that while the guide surface 36 still abuts the antenna 32, the antenna 32 is permitted to achieve its extended position.

Thus, the user of the telephone assembly 20 is able with a single motion to place the first and second housings 22, 24 in their operative position (i.e., to expose the keypad 30) while at the same time adjusting the antenna 32. That is, by moving the second housing 24 relative to the first housing 22, the antenna 32 is moved relative to the guide surface 36 such that the position control mechanism 34 is able to urge the antenna 32 from the retracted position to the extended position. It is not necessary for the user to first move the first and second housings 22, 24 relative to each other, and then separately adjust the antenna 32 to achieve a fully operational position wherein the antenna is disposed remotely from the user's head.

The structure and operation of the telephone assembly 20 are now explained in greater detail with reference first to FIGS. 1 and 2. The first housing 22 has six walls: a curved front wall 40 (defining the surface 28), a curved rear wall 42, a right wall 44 (as shown in FIG. 1, planar with curved edges to match the curvature of the curved front and rear walls 40, 42), a left wall 46 (as shown in FIG. 2, planar with curved edges to match the curvature of the curved front and rear walls 40, 42), a bottom wall 48 and a top wall 50. The second housing 24 has four walls: a curved front wall 52 (defining the surface 26), a top wall 54, a right wall 56 (as shown in FIG. 1, planar with curved edges to match the curvature of the curved front wall 52) and a left wall 58 (as shown in FIG. 2, planar with curved edges to match the curvature of the curved front wall 52). A sliding attachment mechanism 60 is used to secure the first housing 22 to the second housing 24, and in particular, the left wall 46 to the left wall 58 and the right wall 44 to the right wall 56.

The sliding attachment mechanism 60 includes two curved channel-like tracks 62, 64 that are formed in the right and left walls 44, 46 of the first housing 22, respectively. The sliding attachment mechanism 60 also includes two curved rails or shoes 66, 68 formed preferably integrally with the right and left walls 56, 58 of the second housing 24, each with a radius of curvature which matches the radius of curvature of the tracks 62, 64. The tracks 62, 64 and the rails 66, 68 may be shaped so as to provide a joint which resists the lateral movement of the rails 66, 68 relative to the tracks 62, 64. For example, the tracks 63, 68 and rails 66, 68 may be shaped to provide a dovetail, T-type or L-type joint.

Alternatively, the rails 66, 68 may be mounted on the first housing 22, and the tracks 62, 64 may be formed in the second housing 24. FIG. 6 shows such an arrangement, wherein rails 66, 68 are attached to the surface 28 of the wall 40 of the first housing 22, and tracks 62, 64 are formed in the wall 52 of the second housing 24. As mentioned above, the tracks 62, 64 and the rails 66, 68 may be shaped so as to provide a joint which resists the lateral movement of the rails 66, 68 relative to the tracks 62, 64. For example, the tracks 62, 64 and rails 66, 68 may be shaped to provide a dovetail, T-type or L-type joint.

Excessive movement of the second housing 24 relative to the first housing 22 in the direction represented by an arrow 70 in FIG. 3, i.e., beyond the closed position, is prevented by the abutment of the top wall 54 of the second housing 24 with the top wall 50 of the first housing 22. Excessive movement of the second housing 24 relative to the first housing 22 in the direction represented an arrow 72 in FIGS. 1, 2 and 4, i.e., beyond the open position, is prevented by a blocking mechanism 74.

The blocking mechanism 74 includes a first pair of stops 76, 78 preferably formed integrally with the right and left walls 44, 46 of the first housing 22, each stop with a downwardly facing surface (see, e.g., the surface 80 in FIG. 3). The blocking mechanism 74 also includes a second pair of stops 82, 84 formed integrally with the right and left walls 56, 58 of the second housing 24, each stop with an upwardly facing surface (see, e.g., surface 86 in FIG. 3). The abutment of the downwardly facing surfaces (e.g. the surface 80) with the upwardly facing surfaces (e.g. the surface 86) prevents excessive movement of the second housing 24 relative to the first housing 22 in the direction of the arrow 72 (see FIG. 4).

While the second housing 24 is thus preferably attached to the exterior of the first housing 22, the antenna 32 is preferably disposed in the interior of the first housing 22. In particular, the walls 40, 42, 44 of the first housing 22 and an interior wall (not shown) define channel 88. As seen in FIG. 3, the antenna 32 is preferably disposed in the channel 88 with the second housing 24 in the closed position.

Although a blade-type antenna is shown, alternative antenna configurations could be used. For example, a rod-type antenna could be used, the rod-like shaft being connected to a disk for pivotable attachment to the second housing 24. Use of the blade-type antenna is preferred because of the flexibility in antenna design this type of antenna provides.

As explained above, the antenna 32 is preferably pivotably attached to the second housing 24 for movement with the second housing 24 relative to the first housing 22 and for pivotal movement relative to the second housing 24. In particular, a pin 90 is provided which connects a lower end 92 of the antenna 32 to a lower end 94 of the right wall 56 of the second housing 24. The pin 90 is fixedly attached to the right wall 56, and is disposed in a slot or hole in the antenna 32. Alternatively, the pin 90 may be formed as one-piece with the left wall 58 of the second housing 24, as shown in FIG. 7.

As also noted above, the antenna 32 is biased toward the extended position by a position control mechanism or spring 34. The spring 34, a torsional spring as shown, is attached at one end to the antenna 32 and at a second end to the pin 90. The operation of such a spring is well known to those of ordinary skill in the art, and it will be recognized that the action of the spring 34 so attached to the antenna 32 and the second housing 24 will urge the antenna toward pivoting about the lower end 92 in a first direction to the extended position wherein the antenna 32 is spaced away from the second housing 24.

However, to prevent the extension of the antenna 32 when the second housing 24 is in the closed position relative to the first housing 22, the guide surface 36 is provided along the rear wall 42 of the first housing 22 to abut a rearwardly facing edge 96 of the antenna 32 at the first end thereof to thereby block the antenna 32 from pivoting to the extended position shown in FIGS. 1, 2 and 4. With movement of the second housing 24 in the direction of the arrow 72, the guide surface 36 is no longer able to cooperate with the first end of the antenna 32 to block the antenna 32 from pivoting toward the extended position. With further movement of the second housing 24 relative to the first housing 22, guide surface 36 is moved further and further from the first end of the antenna 32, and finally into cooperation with a section of the surface 96 disposed remotely to the first end and proximately to the lower end 92, so as to permit the antenna 32 to achieve its full extended position.

Figure 8:
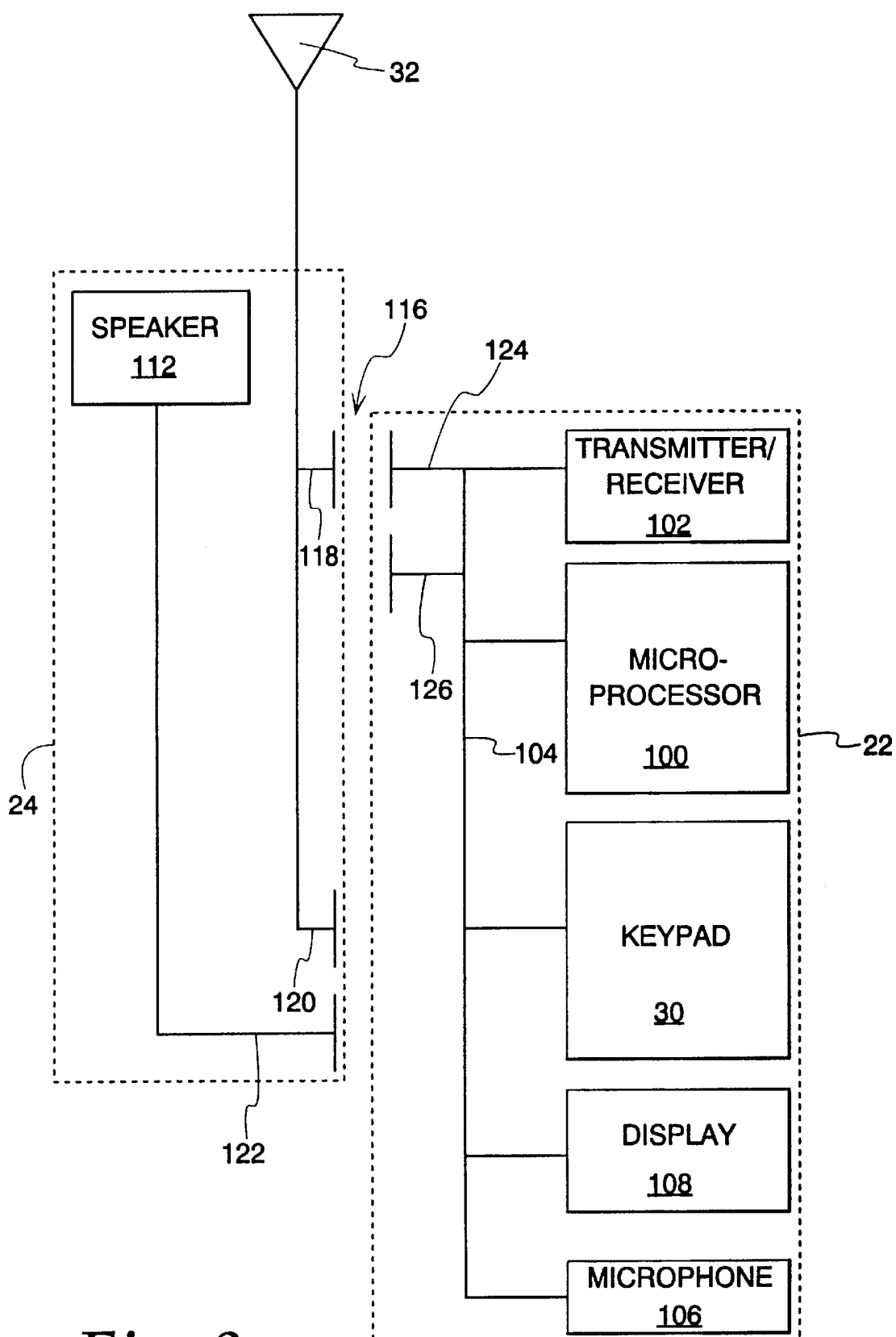
FIG. 8 is a schematic diagram of the circuitry of the telephone assembly shown in FIG. 1.
Figures 9, 10:
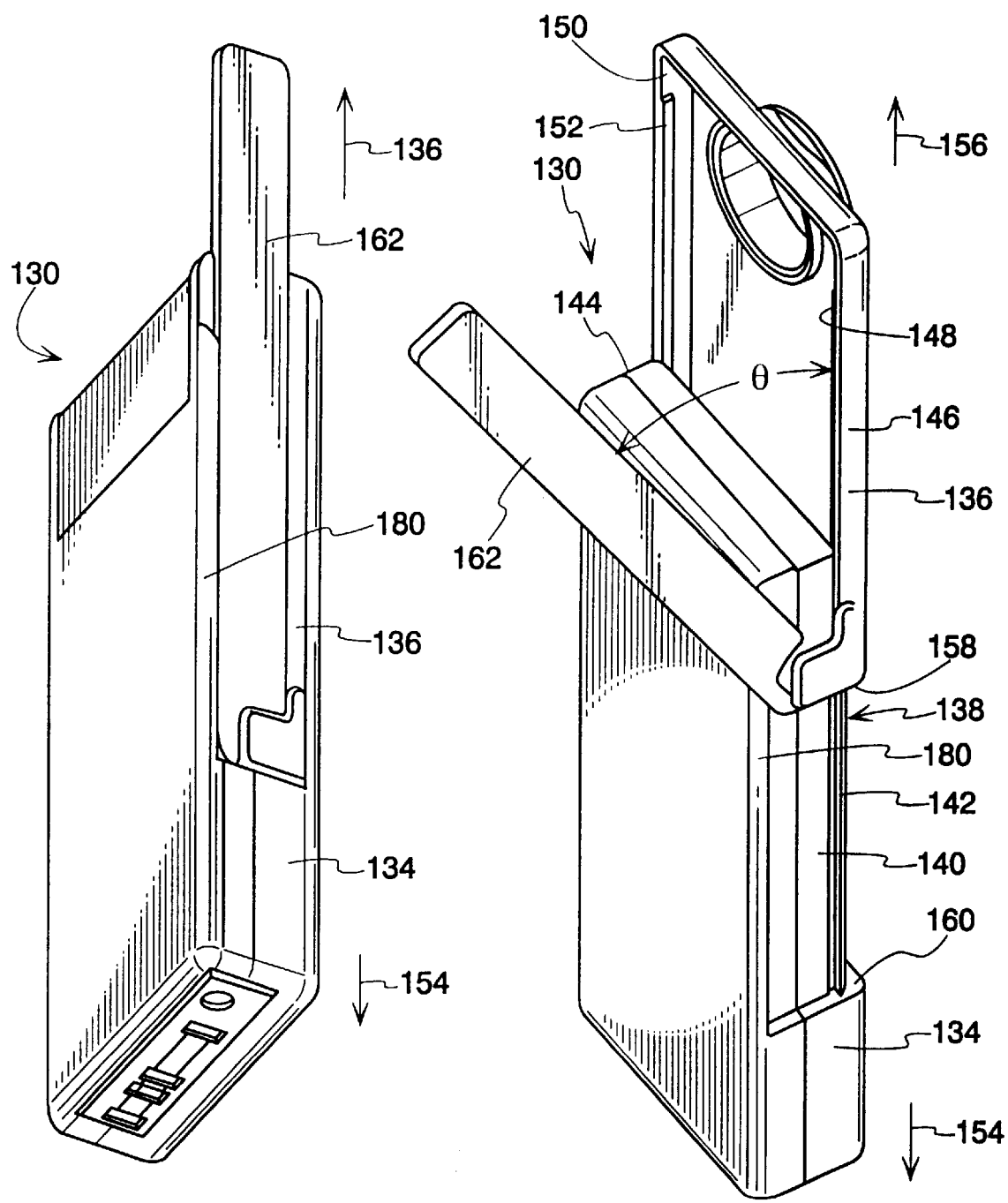
FIG. 9 is a rear, perspective view of another telephone assembly according to the present invention with a second housing in a closed position.
FIG. 10 is a rear, perspective view of the telephone assembly shown in FIG. 9 with the second housing in an open position.

As schematically indicated in FIG. 8, the telephone assembly 20 according to the present invention also includes all of the circuitry needed for two-way communication between the telephone assembly 20 and a cellular base station. To this extent, a microprocessor 100 is provided, housed within the first housing 22. Also housed in the first housing 22 is a transmitter/receiver 102 and a bus 104 which connects the transmitter/receiver 102 to the microprocessor 100. Other elements may be connected to the bus 104 and mounted on or housed in the first housing 22, including the keypad 30, a microphone 106, and a display 108. Still other elements (not shown) could also be mounted to the first housing, including batteries and heat sinks, for example.

As will be recognized by comparing FIG. 3 with FIG. 4, with the second housing 24 in the closed position, the first surface 26 of the second housing 24 substantially overlies the first surface 28 of the first housing 22, and hence the keypad 30. In this fashion, the keypad 30 is protected against damage or accidental activation. However, as the second housing 24 does not extend as far as the display 108 (as is evident from FIG. 1), the display 108 is exposed for unobstructed viewing even with the second housing 24 in the closed position. Of course, if desired, the front wall 52 of the second housing 24 could be extended so that it substantially overlies the display 108 in the closed position as well to prevent damage to the display 108. Alternatively, the display 108 could be moved from the bottom to the top of the first housing 22.

While the microprocessor 100, transmitter/receiver 102, keypad 30, microphone 106, and display 108 are mounted on or to the first housing 22, a speaker 112 is mounted to the second housing 24. In particular, the speaker 112 is mounted in a speaker recess 114 formed at the upper end of the second housing 24 (see FIG. 2). The top wall 50 of the first housing 22 is arcuately shaped to accommodate the speaker recess 114 with the second housing 24 in the closed position. Alternatively, the top wall 54 of the second housing 24 could be arcuately shaped to accommodate the speaker recess 114. As was noted above relative to the first housing 22, other equipment (not shown) could be mounted on the second housing 24, including diversity antennas and shielding, for example.

Given that the antenna 32 and the speaker 112 are disposed in the second housing 24, a connection mechanism 116 is provided to couple the antenna 32 and speaker 112 to the remainder of the circuitry housed in the first housing 22. Specifically, the second housing 24 and the antenna 32 are fitted with contacts 118, 120, 122 and the first housing 22 is fitted with contacts 124, 126. With the second housing 24 in the closed position, the upper contact 118 of the antenna 32 is coupled to the contact 124. With the second housing 24 in the operative position, the antenna contact 120 and the speaker contact 122 are coupled to the contacts 124, 126, respectively. Alternatively, the contacts could be formed so as to provided continuous coupling throughout the movement of the second housing 24 relative to the first housing 22. As a further alternative, the antenna 32 and the speaker 112 may be inductively coupled to the remainder of the circuitry without resort to contacts.

To place the telephone assembly 20 in a fully operative position with the speaker 112 and the microphone 106 spaced to allow proper ear-to-mouth distance therebetween and the antenna 32 spaced at an angle θ relative to the second housing 24, the user holds the first housing 22 fixed in the palm of one hand and exerts a force on the second housing 24 in the direction of the arrow 72. As a consequence, the rails 66, 78 of the second housing 24 ride in the tracks 62, 64 of the first housing 22 until the upwardly facing surfaces of the stops 82, 84 abut the downwardly facing surfaces of the stops 76, 78. At the same time, the antenna 32 is carried with the second housing 24 relative to the first housing 22 by nature of the attachment formed by the pin 90. The spring 34 acts on the antenna 32 to urge the antenna 32 to move from the retracted position to the extended position, and once the antenna 32 moves sufficiently relative to the guide surface 36, the antenna 32 is no longer restricted from moving from the retracted position and achieves the extended position.

Once the call is complete, the procedure is reversed to place the telephone assembly 20 in the closed position wherein the antenna 32 is withdrawn into the channel 88 and the first surface 26 of the second housing 24 is disposed over the first surface 28 of the first housing to prevent damage to the keyboard 30. That is, with the first housing 22 held fixed in the palm of the user's hand, a force is exerted on the second housing 24, for example to the top wall 54, in the direction of the arrow 70. Such a force causes the second housing 24 to move relative to the first housing 22, carrying the antenna 32 therewith through the attachment defined by the pin 90. Eventually, the top wall 54 of the second housing 24 abuts the top wall 50 of the first housing 22 to prevent further motion of the second housing 24 relative to the first housing 22. At the same time, the guide surface 36 defined by the rear wall 42 of the first housing 22 abuts the uppermost end of the rearwardly facing edge 96 of the antenna 32 to block the pivotal movement of the antenna 32 relative to the first and second housings 22, 24, thereby maintaining the antenna 32 in the channel 88.

Another telephone assembly 130 with an alternative position control and blocking mechanism 132 is shown in FIGS. 9–12. As the principal difference between the telephone assembly 20 and the telephone assembly 130 is the position control and blocking mechanism 132, the discussion of the telephone assembly 130 will be principally directed to the structure of the position control and blocking mechanism 132. It would be recognized by one of ordinary skill in the art that while certain details of the telephone assembly 20 are not repeated herein, the details of telephone assembly 20 are generally applicable to and useful with the telephone assembly 130.

The telephone assembly 130, like the telephone assembly 20, has first and second housings 134, 136 which are connected together by a sliding mechanism 138. As part of the sliding mechanism 138, the first housing 134 has a right wall 140 with a right track 142 and a left wall 144 with a left track (not shown). The second housing has a right wall 146 with a right rail or shoe 148 and a left wall 150 with a left rail or shoe 152. The right rail 148 is disposed in the first track 142 and the left rail 152 is disposed in the left track to attach the second housing 136 to the first housing 134 for slidable movement therebetween in first and second directions, as shown by arrows 154, 156 (see FIGS. 9 & 10).

The movement of the second housing 136 relative to the first housing 134 in the direction of the arrow 154 is limited by the cooperation of a downwardly facing edge 158 of the second housing 136 and an upwardly facing edge 160 formed on the first housing 134. With the downwardly facing edge 158 abutting the upwardly facing edge 160, further movement of the second housing 136 relative to the first housing 134 in the direction of the arrow 154 is resisted.

Figure 11:
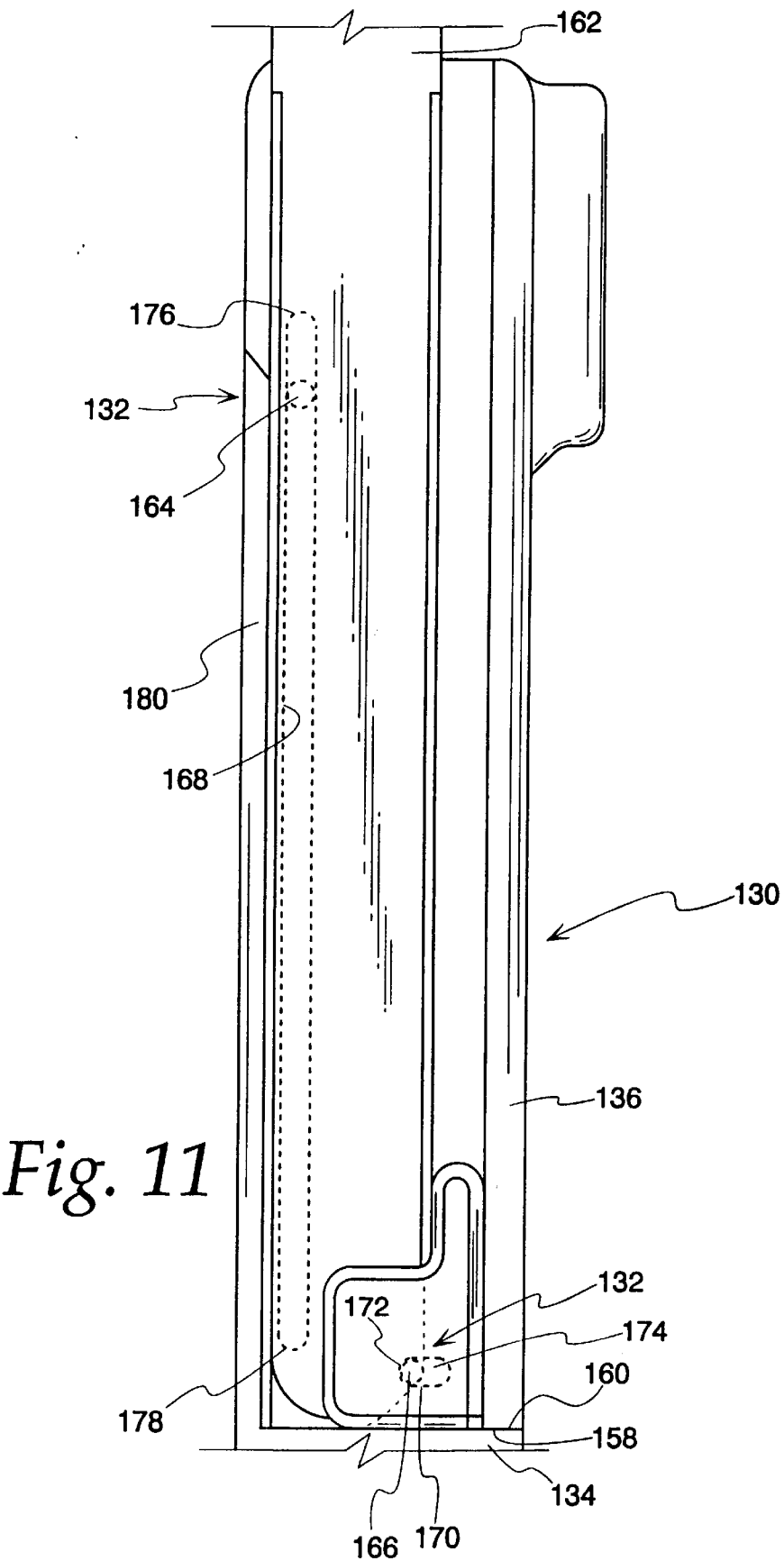
FIG. 11 is an enlarged, fragmentary view of the telephone assembly as shown in FIG. 9 with a second housing in a closed position.
Figure 12:
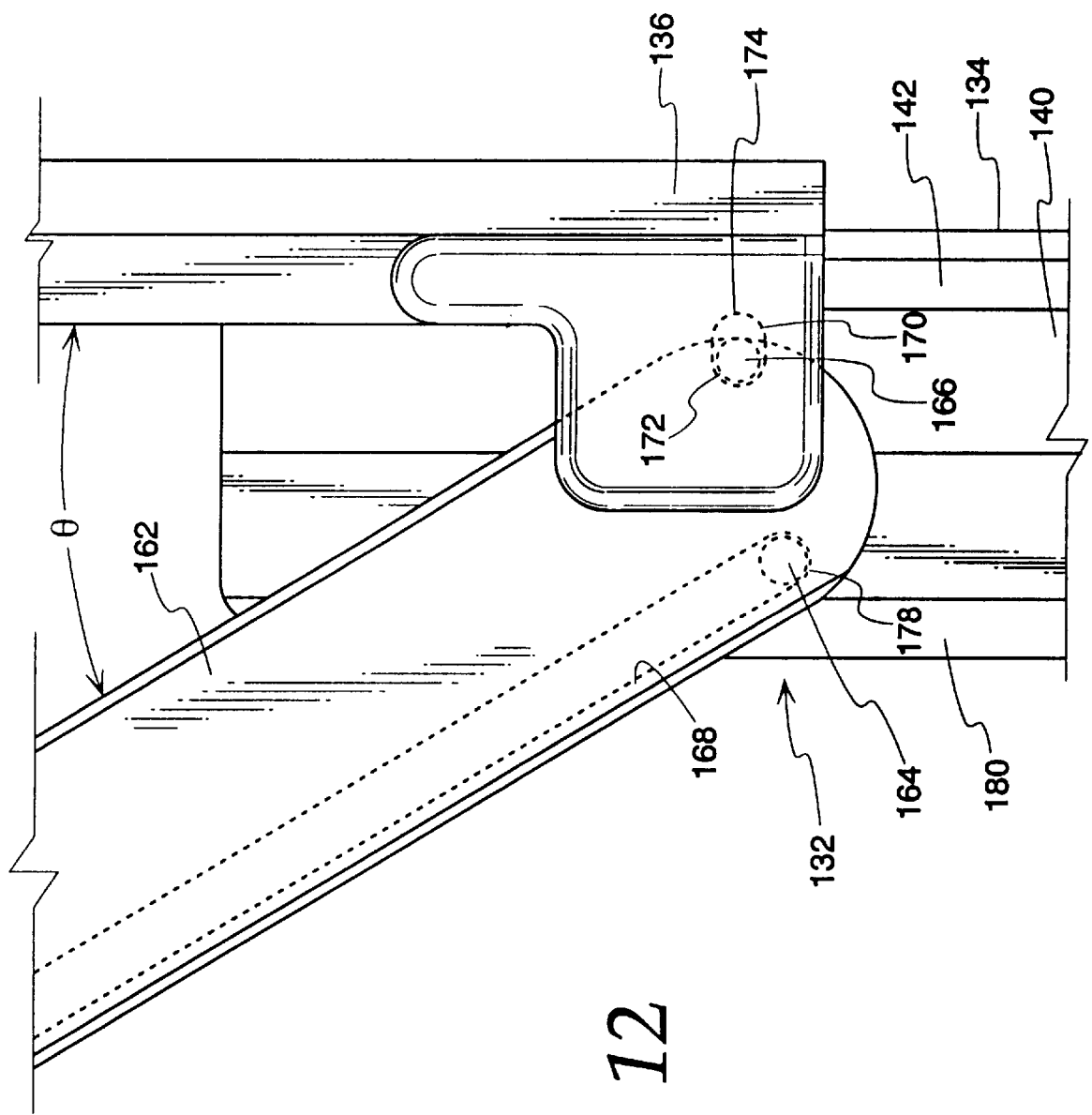
FIG. 12 is an enlarged, fragmentary view of a biasing and locking mechanism shown in FIG. 9 with the second housing in an open position.

As is illustrated in FIGS. 11 and 12 and was mentioned previously, the telephone assembly 130 includes the position control and blocking mechanism 132 (shown in broken line). The position control and blocking mechanism 132 serves two purposes. The mechanism 132 applies a torsional force to an antenna 162 to pivot the antenna 162 away from the second housing 136 as the second housing 136 moves relative to the first housing 134. The mechanism 132 also prevents overextension of the second housing 136 relative to the first housing 134, i.e. excessive movement of the second housing 136 relative to the first housing 134 in the direction of the arrow 156.

The position control and blocking mechanism 132 includes a first pin or projection 164 and a second pin or pivot member 166. The position control and blocking mechanism 132 also includes a first, elongated slot 168 in the antenna 162 and a second, elongated slot 170 in the wall 146 of the second housing 136. As shown, the slot 168 does not extend through the antenna 162, and the slot 170 does not extend through the wall 146. Alternatively, the slots 168, 170 may so extend where the depth of such slot is not significant to the performance and operation of the telephone assembly 130.

As assembled, the first pin 164 is attached to the right wall 140 of the first housing 134, and is disposed for movement within the slot 168 as the second housing 136 and antenna 162 move relative to the first housing 134. The second pin 166 is attached to the antenna 162 and is received in the slot 170 in the right wall 146 of the second housing 136 to transfer the motion of the second housing 136 relative to the first housing 134 to the antenna 162.

In operation, as the second housing 136 and the antenna 162 are moved relative to the first housing 134, the pin 166 and the slot 170 cooperate to transfer the motion of the second housing 136 to the antenna 162. Initially, the pin 166 is disposed within the slot 170 preferably closer to a first effective end 172 of the slot 170 than a second effective end 174. As the second housing 136 moves relative to the first housing 134, the pin 164 moves relatively in the slot 168 from a first position proximate to a first effective end 176 of the slot 168 to a second position proximate to a second effective end 178. As such, the pin 164 and the slot 168 cooperate to guide the antenna 162 as the antenna 162 and the second housing 136 move relative to the first housing 134. A guide 180 attached to the right wall 140 of the first housing 134 also assists in guiding the antenna 162 for translational movement relative to the first housing 134.

As the second housing 136 and the antenna 162 are moved in the direction of the arrow 156 relative to the first housing 134, the pin 166 attached to the antenna 162 moves in the direction of the pin 164 attached to the first housing 134. Eventually, the second housing 136 reaches the position relative to the first housing 134 shown in FIG. 10. In this position, the pin 166 has moved past the pin 164 in the direction of the arrow 156, which has caused the pin 166 to move within the slot 170 from the first effective end 172 to second effective end 174 and then back to the first effective end 172. Together, the pins 164, 166 and slots 166, 168 cooperate to provide a torsional force on the end of the antenna 162. Consequently, the antenna 162 is pivoted relative to the second housing 136 from a retracted position to an extended position wherein the antenna 162 is at an angle θ to the second housing 136.

While a pin and slot configuration is shown for applying the torsional force to the antenna 162 to cause rotation of the antenna 162 relative to the first and second housings 134, 136, it will be recognized that the cooperating surfaces which abut to provide the torsional force need not be in the form of a pin and slot. In fact, all manner of surfaces which abut to convert the translational movement of the second housing 136 relative to the first housing 134 into the rotational movement of the antenna 162 relative to the first and second housings 134, 136 are encompassed within the scope of this embodiment of the present invention. For example, the surface abutted by the pin or projection attached to the first housing need not be in the form of a slot, but may be defined by the rearwardly facing edge of the antenna.

It will also be recognized that in addition to urging the antenna 162 from the retracted to the extended position, the cooperation of the pin 164 and the slot 168 prevents further motion of the second housing 136 relative to the first housing 134 to which the pin 164 is attached. Through the cooperation of the pin 166 and the slot 170, the force acting on the antenna 162 through the cooperation of the pin 164 and the slot 168 is transmitted to the second housing 136 to resist further motion of the second housing in the direction of the arrow 154. Therefore, the assembly including the pins 164, 166 and slots 168, 170 also provides to prevent overextension of the second housing 136 relative to the first housing 134.

It will be further recognized that rather than having the antenna 162 disposed within a channel 88, as in the telephone assembly 20, the antenna 162 is substantially exposed to the environment. An alternative exposed, or external, antenna mounting is shown in FIG. 13, wherein the left wall 144 and front and back walls 182, 184 of the first housing 134 define a slot 186 in which the antenna 162 is disposed in the closed position, covered only in part by the left wall 150 of the second housing 136.

Still another telephone assembly 188 according to the present invention is shown in FIGS. 14–17. The principal difference between the telephone assembly 188 and the telephone assemblies 20, 130 is the structure of the position control mechanism 190. Therefore, the discussion of the telephone assembly 188 will be directed principally to this structure, with the caveat that it would be recognized by one of ordinary skill in the art that certain details of the telephone assemblies 20, 130 are generally applicable to and useful with the telephone assembly 188 while not repeated herein.

Figure 14:
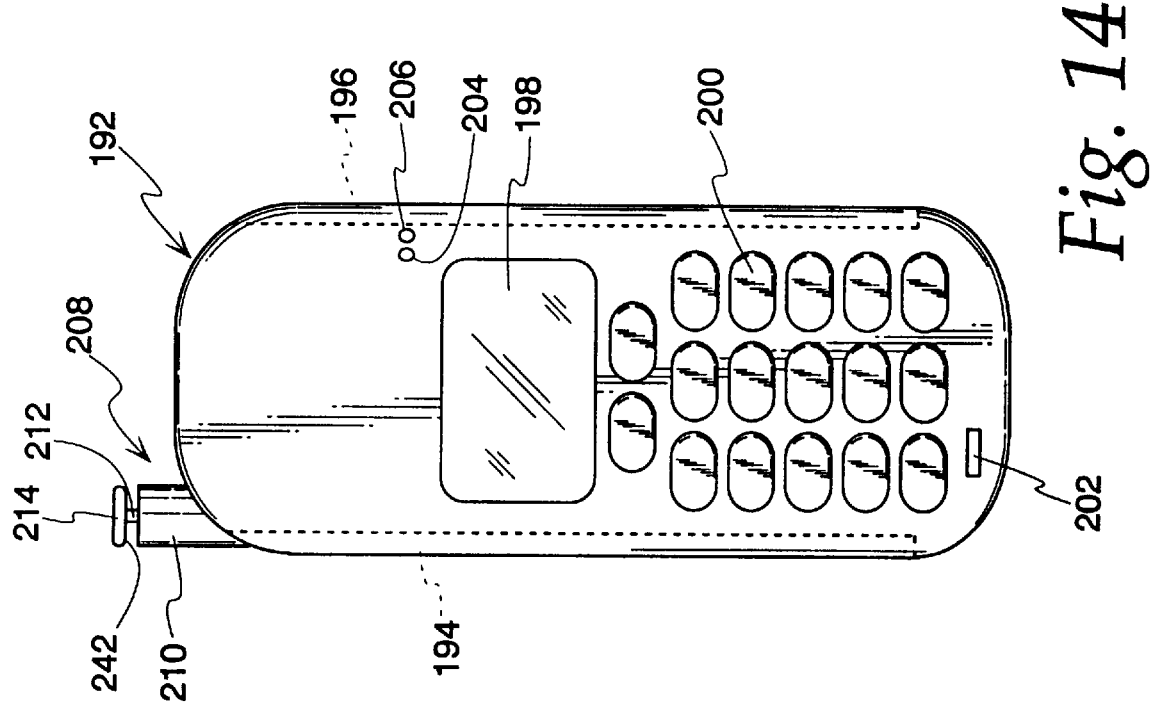
FIG. 14 is a frontal view of a first housing of still another telephone assembly according to the present invention.

With reference to FIG. 14, a first housing 192 of the telephone assembly 188 is shown having tracks 194, 196 (in broken line). The first housing 192 also has a display 198, a keypad 200, a microphone 202 and contacts 204, 206. The display 198, keypad 200 and microphone 202 may be of conventional design, and the contacts 204, 206 may be suitable contacts such as pogo pins, springs or formed metal contacts. Circuitry (not shown) necessary to communicate with a base station (also not shown) would be mounted in the first housing 192. Such circuitry may include a transmitter, a receiver, a microprocessor and memory.

The first housing 192 further has a conventional rod-type retractable antenna 208. The rod-type antenna 208 includes a case 210, a rod 212 which is moveable relative to the case 210 between a retracted and an extended position and a button-shaped top 214. Alternatively, other types of antennas may be used, including the blade-type antenna discussed above.

Figure 15:
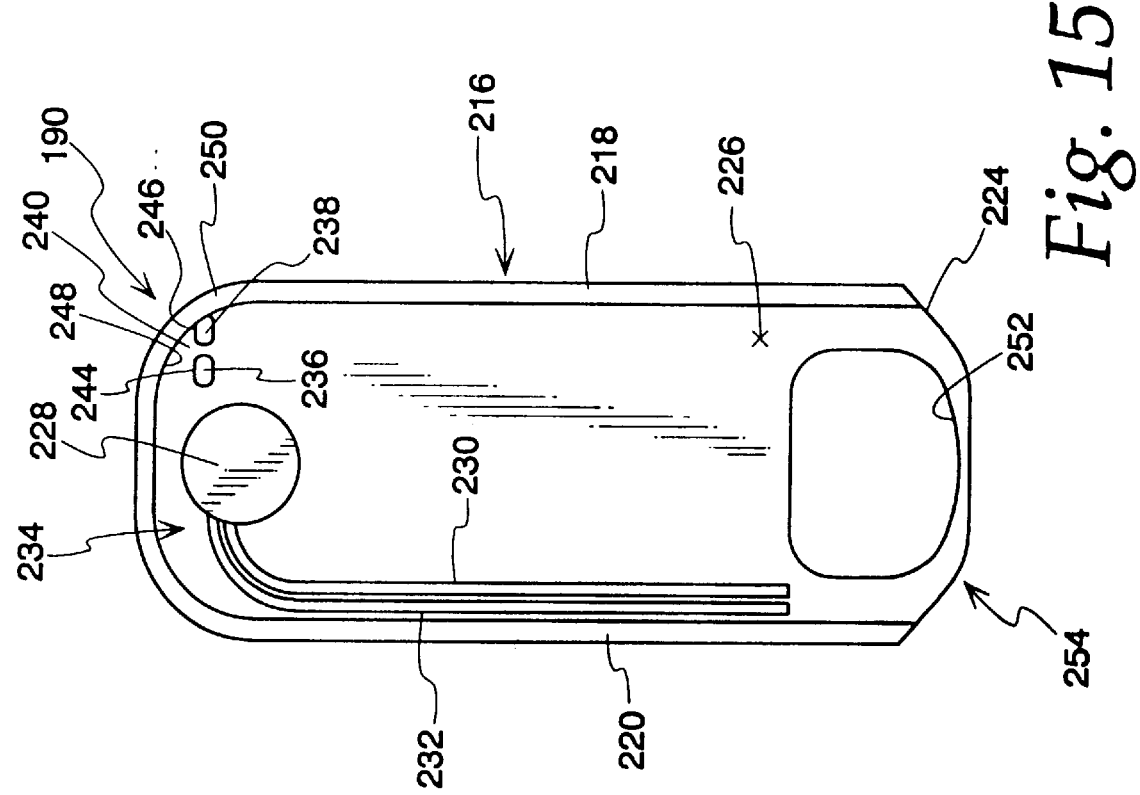
FIG. 15 is a rear view of a second housing for use with the first housing shown in FIG. 14.

A second housing 216 is shown in FIG. 15, the second housing 216 being attached to the first housing 192 to form the telephone assembly 188. For this purpose, the second housing 216 has first and second rails 218, 220, which rails 218, 220 are disposed in the tracks 194, 196 to provide a sliding attachment mechanism to attach the second housing 216 to the first housing 192 for sliding motion relative thereto. As mentioned above, the rails 218, 220 and the tracks 194, 196 may be shaped so as to provide a joint which resists the lateral movement of the rails 218, 220 relative to the tracks 194, 196, for example, a dovetail, T-type or L-type joint.

The second housing 216 also has a wall 224 with a surface 226. A speaker 228 with traces 230, 232 coupled thereto at a first end 234 is attached to the surface 226 of the wall 224. The speaker traces 230, 232 could be stamped from metal and then glued or ultrasonically welded or staked to the surface 226, or photoetched into a plating placed on the surface 226, or formed of a flexible film which is attached to the surface 226, or formed using conventional printed circuit board technology. The traces 230, 232 abut the contacts 204, 206 to couple the speaker 228 to the circuitry (not shown) mounted in the first housing 192. Alternative forms of coupling between the speaker 228 and the circuitry may also be used, such as inductive coupling. Also a cover (not shown) may be disposed over the traces 230, 232 to prevent damage to the traces 230, 232, and to improve the appearance of the telephone assembly 188.

Also attached to the surface 226 of the wall 224 is the position control mechanism 190, which includes a pair of arms 236, 238 which extend from the surface 226 of the wall 224. The arms 236, 238 are spaced to define a slot 240 therebetween in which is received the rod 212 of the antenna 208 with the first housing 192 attached to the second housing 216. With the rod 212 disposed in the slot 240, a lower surface 242 of the button-shaped top 214 abuts upper surfaces 244, 246 of the arms 236, 238.

Figures 16, 17:
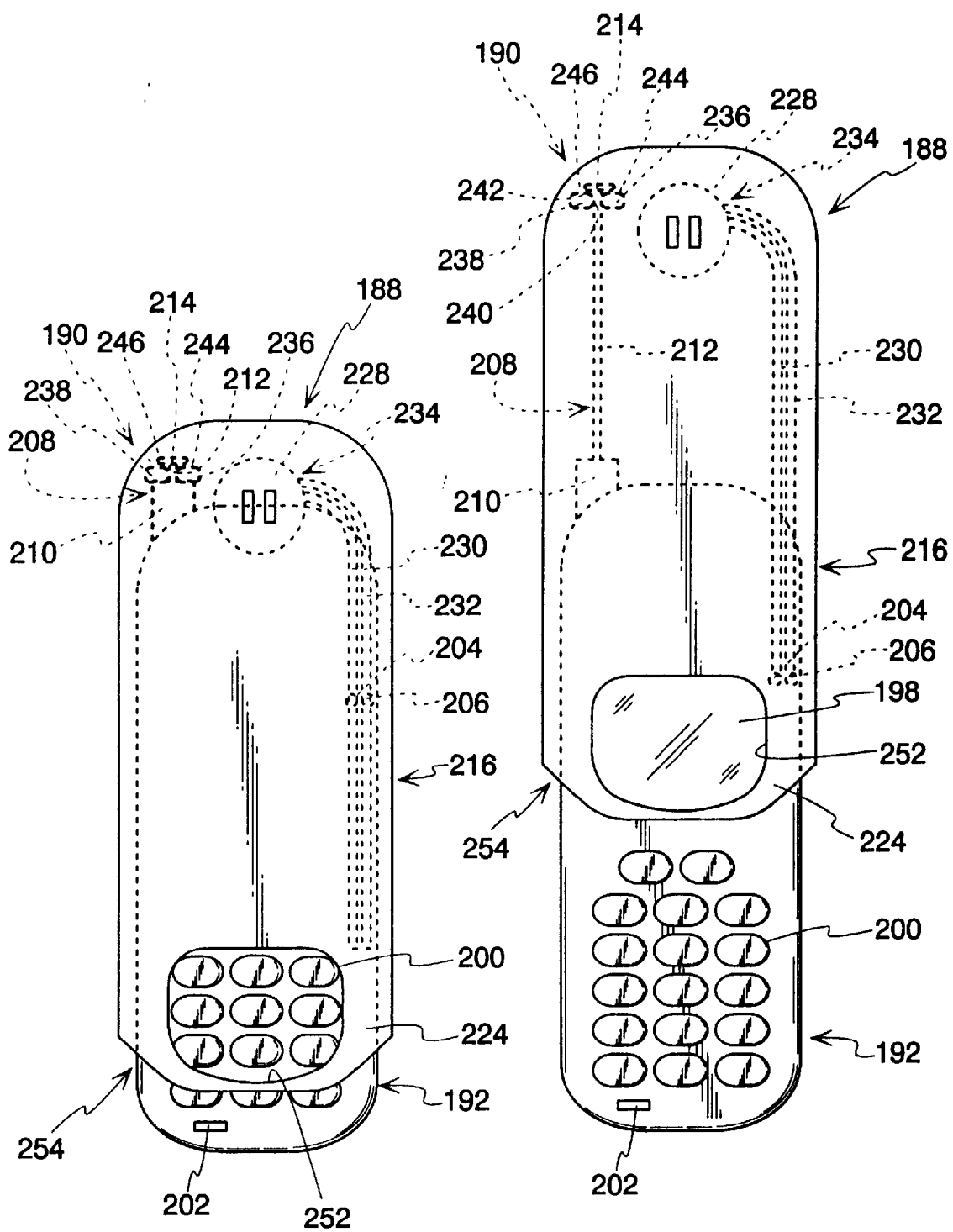
FIG. 16 is a frontal view of the assembly of the first and second housings of FIGS. 14 and 15 in a closed position.
FIG. 17 is a frontal view of the assembly of FIG. 16 in an open position.

As shown in FIGS. 16 and 17, as the second housing 216 is moved relative to the first housing 192 from a closed position (FIG. 16) to an open position (FIG. 17), the arms 236, 238 act against the top 214 of the antenna 208 to apply a force which causes the rod 212 to be extended from the case 210. On the other hand, as the second housing 216 is moved relative to the first housing 194 from the open position to the closed position, a surface 248 of a wall 250 of the second housing 216 applies a force to the top 214 of the antenna 208 to urge the rod 212 into the antenna case 210. In this fashion, the antenna 208 is adjusted between retracted and extended positions simply by moving the first and second housings 192, 216 relative to each other, thereby conserving the movement required to move the telephone assembly 188 between inoperative and operative states.

It will also be noted that unlike the telephone assemblies 20, 130, the display 198 is covered by the wall 224 of the second housing 216 with the second housing 216 in the closed position (FIG. 16) relative to the first housing 192. To permit viewing access to the display 198 with the second housing 216 in the open position (FIG. 17), a window 252 is provided in the wall 224 at a lower end 254 thereof. A clear material, such as a clear plastic, may be disposed in the window 252 to prevent contact with the display 198 while permitting viewing access. As an alternative, the window 252 may be shaped to allow viewing of the display 198 even with the second housing 216 in the closed position.

A further alternative telephone assembly 256 according to the present invention is shown in FIGS. 18–21. The principal difference between the telephone assembly 256 and the telephone assemblies 20, 130, 188 is the structure of the antennas 258, 260 and the mechanism used to adjust between the two. Therefore, the discussion of the telephone assembly 256 will be directed principally to this structure, with the caveat that it would be recognized by one of ordinary skill in the art that certain details of the telephone assemblies 20, 130, 188 are generally applicable to and useful with the telephone assembly 256 while not repeated herein.

Figure 18:
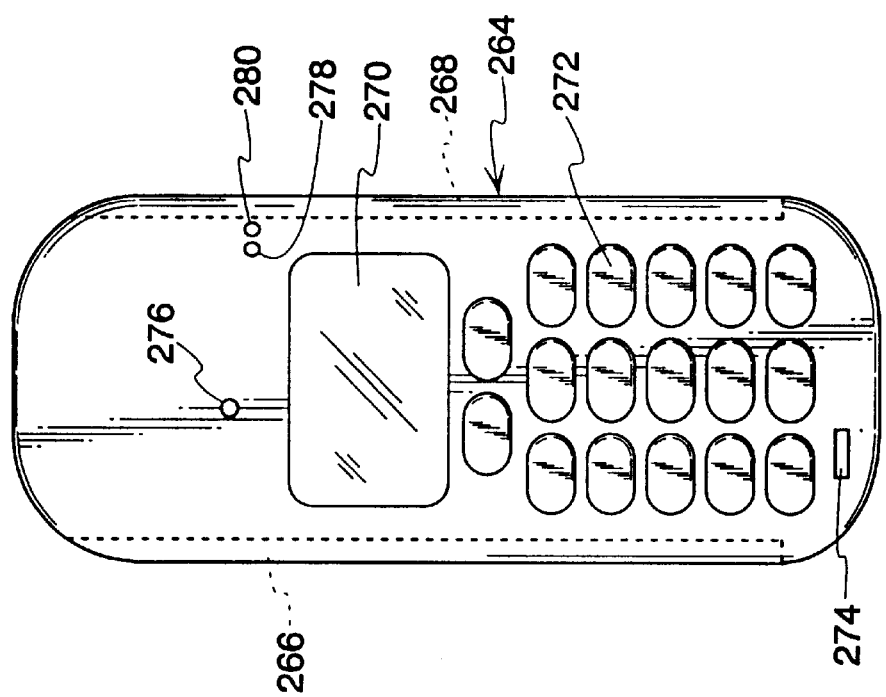
FIG. 18 is a frontal view of a first housing of a further telephone assembly according to the present invention.
Figure 20:
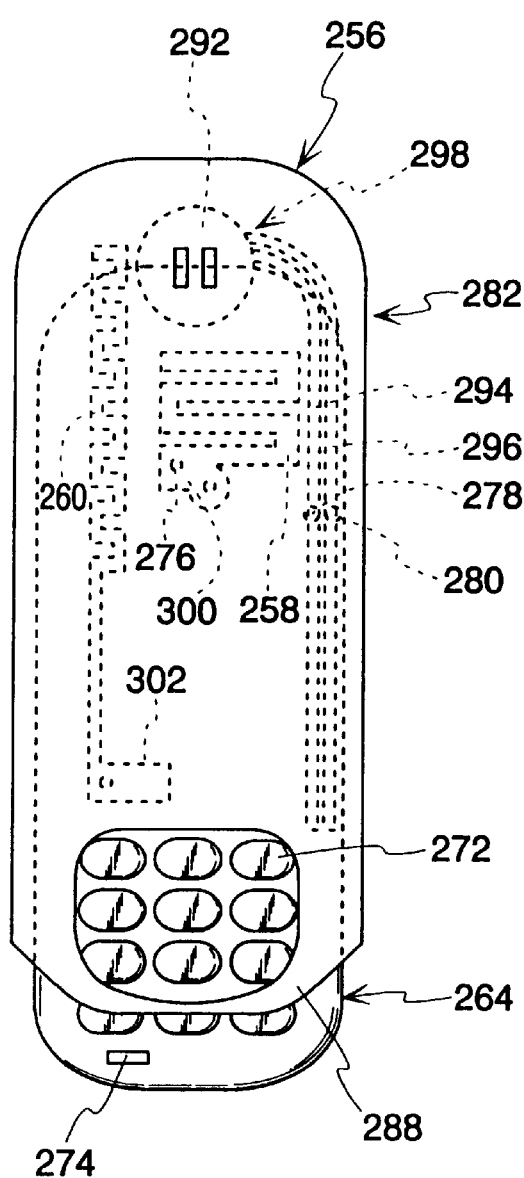
FIG. 20 is a frontal view of the assembly of the first and second housings of FIGS. 18 and 19 in a closed position.

With reference to FIG. 18, a first housing 264 of the telephone assembly 256 has tracks 266, 268 (shown in broken line). The first housing 264 also has a display 270, a keypad 272, a microphone 274 and contacts 276, 278, 280. The display 270, keypad 272 and microphone 274 may be of conventional design, and the contacts 276, 278, 280 may be suitable contact such as pogo pins, springs or formed metal contacts. As mentioned previously, circuitry (not shown) necessary to communicate with a base station (also not shown) would be mounted in the first housing 264.

Figure 19:
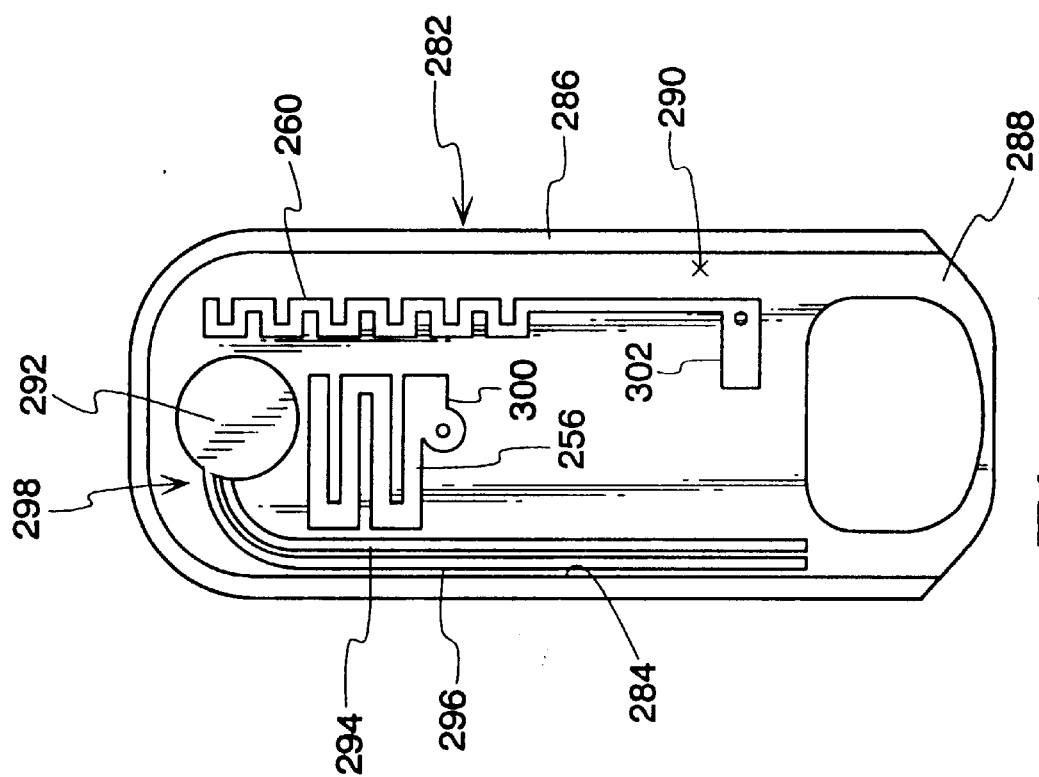
FIG. 19 is a rear view of a second housing for use with the first housing shown in FIG. 18.

A second housing 282 is shown in FIG. 19, which has rails 284, 286 to be disposed within the tracks 266, 268 to attach the second housing 282 to the first housing 264. The second housing 282 also has a wall 288 with a surface 290. A speaker 292 is attached to the wall 288, with traces 294, 296 attached to the surface 290 of the wall 288 and coupled at a first end 298 to the speaker 292. Also attached to the surface 290 of the wall 288 are the first and second antennas 258, 260, which may be quarter and half wavelength antennas with contact pads 300, 302, respectively. A suitable cover (not shown) may be placed over the traces 294, 296 and antennas 258, 260 to protect the traces 294, 296 and antennas 258, 260 from incidental contact, and to improve the appearance of the telephone assembly 256.

It will be recognized by one of ordinary skill in the art that the speaker traces 294, 296 and the first and second antennas 258, 260 could be stamped from metal and then glued or ultrasonically welded or staked to the surface 290. Alternatively, the surface 290 could be plated, and the traces 294, 296 and antennas 258, 260 photoetched into the plated surface 290 of the second housing 282. As a still further alternative, the traces 294, 296 and antennas 258, 260 could be formed of a flexible film which is attached to the surface 290, or formed using conventional printed circuit board technology.

As shown in FIG. 19, the contact pads 300, 302 of the antennas 258, 260 are aligned along a longitudinal axis of the second housing 282. In this way, a single contact, the contact 276, can be used to couple either of the antennas 258, 260 to the circuitry (not shown) mounted in the first housing 264. Also, this arrangement ensures that one of the antennas 258, 260 is uncoupled from the circuitry when the other of the antennas 258, 260 is coupled to the circuitry.

Figure 21:
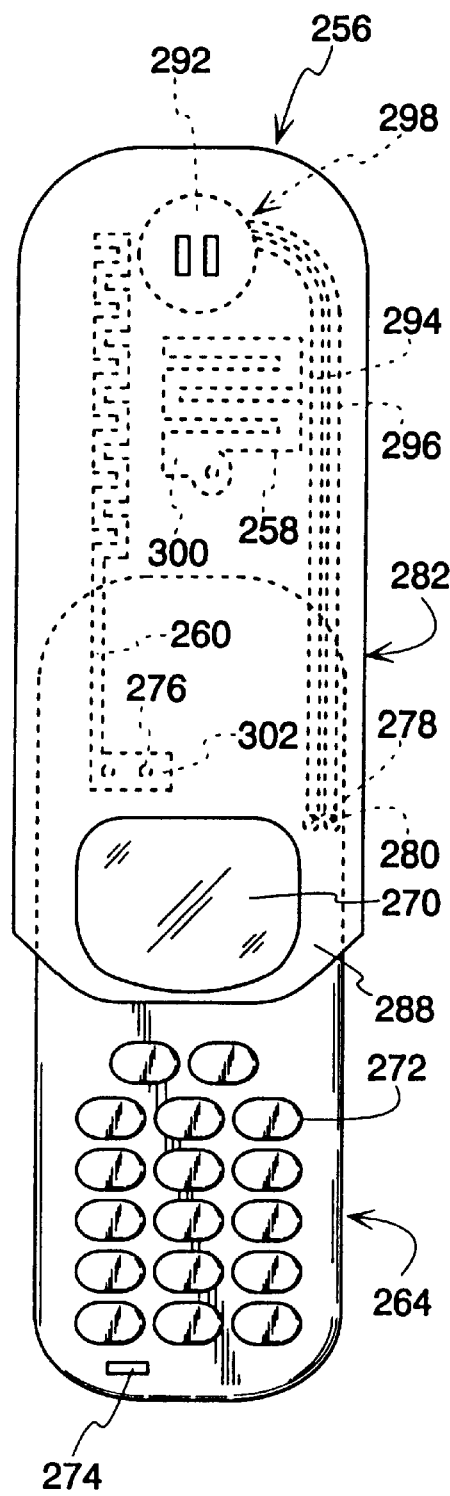
FIG. 21 is a frontal view of the assembly of FIG. 18 in an open position.

As assembled with the rails 284, 286 of the second housing 282 disposed within the tracks 266, 268 of the first housing 264, the second housing 282 is slideably moveable relative to the first housing 264 between a closed position (FIG. 20) and an open position (FIG. 21). As shown, with the second housing 282 in the closed position relative to the first housing 264, the quarter wavelength antenna 258 is coupled to the circuitry mounted in the first housing 264. With the second housing 282 in the open position relative to the first housing 264, the half wavelength antenna 260 is coupled to the circuitry mounted in the first housing 264. Thus, by moving the second housing 282 relative to the first housing 264 between the closed and open positions, an adjustment between a quarter wavelength and a half wavelength antenna can be made.

As a consequence, the telephone assembly according to the present invention allows for one-handed operation, wherein movement of the first and second housings and adjustment of the antenna is achieved in a single motion. The one-handed operation eliminates the need to perform the additional step or steps of adjusting the antenna once the telephone assembly has been moved into its operative position.

Moreover, the sliding connection between the first and second housings is simpler to operate ergonomically than the conventional "flip" design and maintains an advantageous speaker-to-microphone placement of at least 140 mm in a phone assembly with a footprint of less than 80 mm. Also, many of the delicate parts necessary to proper operation of flip telephones are eliminated through the use of a sliding connection in the telephone assembly according to the present invention.

Further, the remote placement of the antenna at an angle θ relative to the second housing (and hence the user's head) comes with an improvement in the simplicity of the telephone assembly. By disposing the antenna outwardly from the user's head, this obstruction to radio waves to and from the telephone assembly is reduced or limited.

Still other aspects, objects, and advantages of the present invention can be obtained from a study of the specification, the drawings, and the appended claims.

I claim:

1. A telephone comprising:
   a first housing;
   a second housing slideably secured to the first housing for movement between an open position and a closed position, said second housing projecting out from said first housing in said open position with said telephone in an operative state;
   an antenna pivotably attached to said second housing;
   a position control mechanism pivoting said antenna away from said second housing responsive to said second housing sliding to said open position relative to said first housing; and
   a guide securing said antenna against pivoting when said second housing is in said closed position.

2. The telephone of claim 1, further comprising:
   a wall attached to one of the first and second housings with an channel-like track defined therein; and
   a rail-like guide attached to the other of the first and second housings which is disposed in the channel-like track.

3. The telephone of claim 2, wherein the channel-like track has a pair of oppositely facing curved sides which define a curved pathway, and the rail-like guide has a pair of curved sides each of which face one of the sides of the channel-like track.

4. The telephone of claim 2, wherein the channel-like track has a pair of oppositely facing planar sides which define a linear pathway, and the rail-like guide has a pair of planar sides each of which face one of the sides of the channel-like track.

5. The telephone of claim 1, wherein:
   the first housing has a wall; and
   the second housing has a wall which when the second housing is in the closed position substantially overlies the first housing wall and which when the second housing is in the open condition is disposed remotely from the first housing wall so that the first housing wall is exposed.

6. The telephone of claim 5, wherein:
   the first housing wall has a first section and a second section; and
   the second housing wall overlies only the first section of the first housing wall when the second housing is in the closed position.

7. A telephone, comprising:
   a first housing;
   a second housing slideably secured to the first housing for movement between an open position and a closed position, said second housing projecting out from said first housing in said open position;
   an antenna pivotably attached to said second housing;
   a position control mechanism pivoting said antenna away from said second housing; and
   a guide securing said antenna against pivoting when said second housing is in said closed position, said guide being attached to the first housing and said first housing having a first wall which faces the guide to define a channel-like space therebetween wherein the antenna is substantially disposed within the channel-like space with the second housing in the closed position and substantially projects from the channel-like space with the second housing in the open position.

8. The telephone of claim 7, wherein:
   the first housing has a second wall adjacent the channel-like space; and
   the antenna is disposed on one side of the second wall and the second housing is disposed on the other side of the second wall.

9. The telephone of claim 8, further comprising a pin fixedly attached to the antenna and pivotably attached to the second housing, the second wall of the first housing having a slot therethrough through which the pin depends.

10. A telephone comprising:
   a first housing having a wall with a first section and a second section;
   a second housing slideably secured to the first housing for movement between an open position and a closed position, said second housing projecting out from said first housing in said open position, said second housing further having a wall which when the second housing is in the closed position substantially overlies only the first section of the first housing wall and which when the second housing is in the open position is disposed remotely from the first housing wall so that the first housing wall is exposed;
   an antenna pivotably attached to said second housing;
   a position control mechanism pivoting said antenna away from said second housing;
   a guide securing said antenna against pivoting when said second housing is in said closed position;
   a keypad attached to the first section of the first housing wall; and
   a display attached to the second section of the first housing wall.

11. A telephone, comprising:
   a first housing;
   a second housing slideably secured to the first housing for movement between an open position and a closed position, said second housing projecting out from said first housing in said open position;
   an antenna pivotably attached at one end to said second housing;
   a biasing member urging said antenna toward pivoting about said one end in a first direction to an extended position away from said second housing; and a guide blocking said antenna from pivoting to said extended position when said second housing is in said closed position, said guide allowing said biasing member to move said antenna to said extended position responsive to said second housing being in said open position.

12. The telephone according to claim 11, wherein the biasing member comprises a torsional spring.

13. A telephone, comprising:

a first housing;

a second housing slideably secured to the first housing for movement between an open position and a closed position, said second housing projecting out from said first housing in said open position;

an antenna pivotably attached at one end to said second housing;

a biasing member urging said antenna toward pivoting about said one end in a first direction to an extended position away from said second housing; and a guide blocking said antenna from pivoting to said extended position when said second housing is in said closed position, said guide being attached to the first housing and said first housing having a first wall which faces the guide to define a channel-like space therebetween wherein the antenna is substantially disposed within the channel-like space with the second housing in the closed position and substantially projects from the channel-like space with the second housing in the open position.

14. The telephone of claim 13, wherein:

the antenna comprises a blade-type antenna having a first end which is pivotably attached to the second housing and a second end having an enlarged head which abuts the guide with the antenna in the channel-like space.

15. A telephone comprising:

a first housing;

a second housing slideably secured to the first housing for movement between an open position and a closed position, said second housing projecting out from said first housing in said open position;

an antenna;

a pivot member attaching said antenna to said second housing; and a guide assembly controlling movement of said antenna relative to said first housing when said second housing moves between said open and closed positions, said guide assembly including a pivot control mechanism cooperating with said pivot member to pivot said antenna to an extended position away from said second housing when said second housing is moved to said open position.

16. The telephone of claim 15, wherein the pivot control mechanism comprises a first surface defined on the first housing and a second curved surface defined on the antenna, the first surface abutting the second curved surface at a position offset from the pivot member.

17. The telephone of claim 16, wherein the pivot control mechanism comprises a pin attached to the first housing which defines the first surface and a slot in the antenna which is defined by the second surface.

18. The telephone of claim 17, wherein:

the pivot member comprises a pin attached to the antenna having a first cross-sectional area; and the second housing has a slot in which the antenna pin is disposed which has a cross-sectional area which is greater than the cross-sectional area of the antenna pin.

19. The telephone of claim 15, wherein said guide assembly comprises a pin and slot connection between said antenna and said first housing, said slot extending substantially in the direction of sliding movement of said second housing.

20. The telephone of claim 19, wherein said pivot control mechanism comprises a slot end engaging said pin prior to said second housing reaching said open position.

21. A telephone comprising:

a first housing;

a second housing slideably secured to the first housing for movement between an open position and a closed position, said second housing projecting out from said first housing in said open position; and an antenna slideably secured to the first housing and having a first end which is moveable between an extended position and a retracted position, said antenna projecting out from said first housing with the first end spaced from the first housing in said extended position, a control mechanism attaching said first end of the antenna to the second housing.

22. The telephone of claim 21, wherein:

the antenna comprises a rod having a first end which defines the first end of the antenna; and the control mechanism comprises a pair of arms projecting from the second housing and defining a slot therebetween in which the first end of the rod is disposed to attach the first end of the antenna to the second housing.

23. A telephone comprising:

a first housing;

a contact on the first housing;

a second housing slideably secured to the first housing for movement between an open position and a closed position, said second housing projecting out from said first housing in said open position; and first and second antennas on second housing, the first antenna positioned on said second housing to couple with the contact when the second housing is in the closed position, the second antenna position on said second housing to couple with the contact when the second housing is in the open position.

24. The telephone of claim 23, wherein:

the first housing has a wall with a surface; and the second housing has a wall with a surface which faces the surface of the wall of the first housing with the second housing in the closed position, the first and second antennas attached to the surface of the second housing.

25. The telephone of claim 24, wherein the first and second antennas comprise metal stampings which are glued to the surface of the wall of the second housing.

26. The telephone of claim 24, wherein the first and second antennas comprise metal stampings which are ultrasonically attached to the surface of the wall of the second housing.

27. The telephone of claim 24, wherein the first and second antennas comprise thin flexible films which are attached to the surface of the wall of the second housing.

28. The telephone of claim 24, wherein the first and second antennas comprise photoetched platings on the surface of the wall of the second housing.

* * * * *